(12) United States Patent
Echizen et al.

(10) Patent No.: US 7,577,843 B2
(45) Date of Patent: Aug. 18, 2009

(54) SYSTEM AND METHOD FOR CONTROLLING CONTENTS BY PLURALITY OF PIECES OF CONTROL INFORMATION

(75) Inventors: Isao Echizen, Yokohama (JP); Takao Arai, Yokohama (JP); Hiroyuki Kimura, Hiratsuka (JP); Takaaki Yamada, Osaka (JP); Yasuhiro Fujii, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1142 days.

(21) Appl. No.: 10/862,875

(22) Filed: Jun. 8, 2004

(65) Prior Publication Data
US 2005/0120218 A1      Jun. 2, 2005

(30) Foreign Application Priority Data
Dec. 2, 2003    (JP)  ............................. 2003-402400

(51) Int. Cl.
  H04N 7/167  (2006.01)
  G06K 9/00    (2006.01)
(52) U.S. Cl. .................. 713/176; 380/201; 382/100; 386/E5.004
(58) Field of Classification Search .................. 382/100; 380/201; 713/176
  See application file for complete search history.

(56) References Cited

U.S. PATENT DOCUMENTS

| | | | |
|---|---|---|---|
| 7,337,321 B2 * | 2/2008 | Terada et al. ................. | 713/176 |
| 2003/0002708 A1 * | 1/2003 | Pasqua ......................... | 382/100 |
| 2003/0191941 A1 * | 10/2003 | Terada et al. ................. | 713/176 |

FOREIGN PATENT DOCUMENTS

| | | |
|---|---|---|
| JP | 11-145840 | 5/1999 |
| JP | 2001-245132 | 9/2001 |
| JP | 2002-91465 | 3/2002 |
| JP | 2002-232693 A | 8/2002 |
| JP | 2003-32469 | 1/2003 |
| WO | WO 99/36876 | 7/1999 |

OTHER PUBLICATIONS

Japanese Office Action issued in Japanese Patent Application No. JP 2003-402400, mailed Nov. 13, 2007.
Bloom, Jeffrey A., "Copy Protection for DVD Video." Proceedings of the IEEE, vol. 87, No. 7, pp. 1267-1276, Jul. 1999.

* cited by examiner

*Primary Examiner*—Charles Kim
*Assistant Examiner*—Stephen R Koziol
(74) *Attorney, Agent, or Firm*—McDermott Will & Emery LLP

(57) ABSTRACT

At least one kind of control signal concerning control of contents, added to specific locations inside contents data, is detected as first control information, and at the same time, at least one kind of control information concerning control of contents, embedded inside the contents data by a digital watermark, is detected as second control information. Consistency between the first control information as detected, and the second control information as detected is determined and on the basis of results of the determination, the control of the contents is executed. Thus, it is possible to reduce a possibility of the contents being improperly copied, thereby enabling the control with assurance of still higher safety.

3 Claims, 14 Drawing Sheets

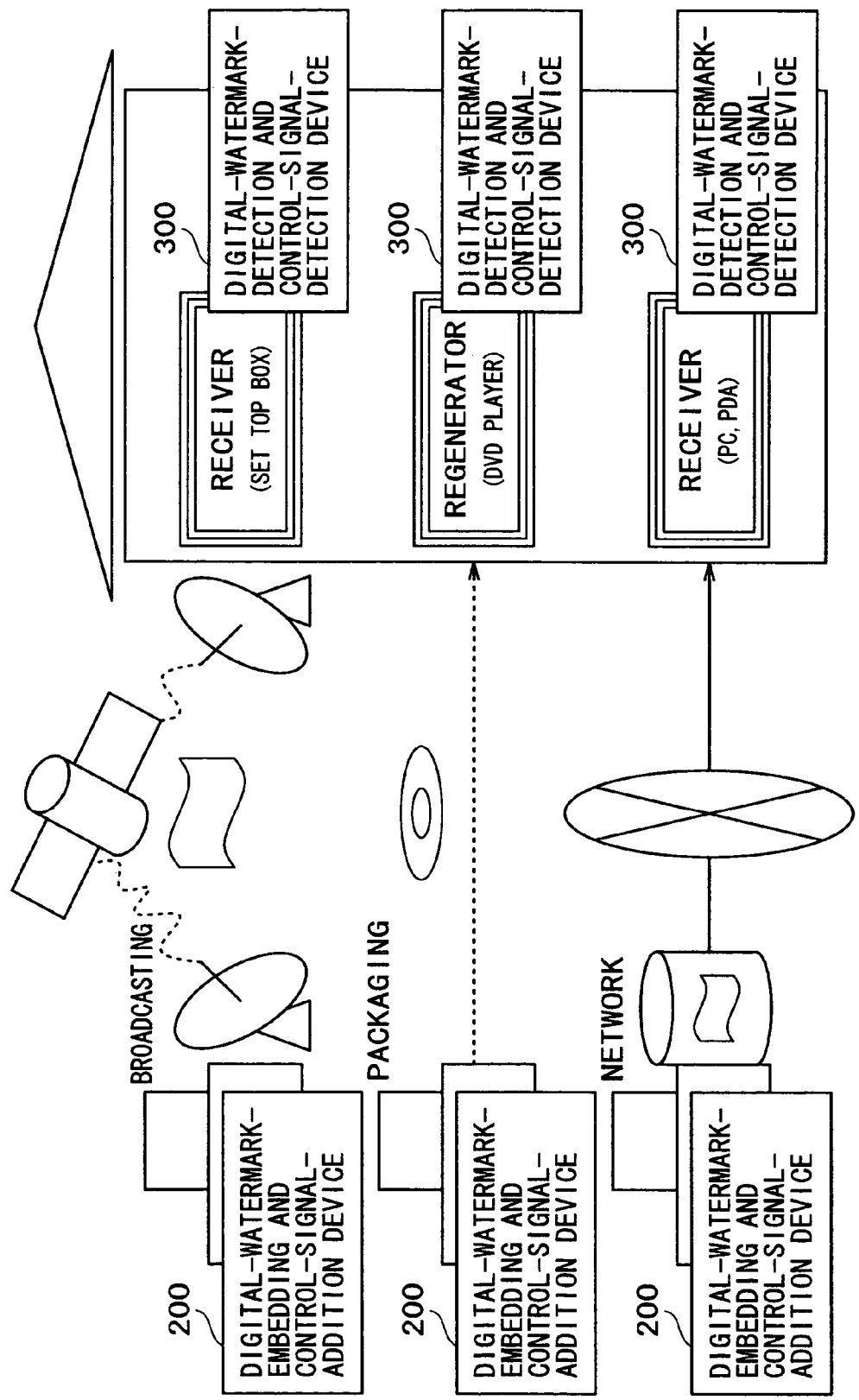

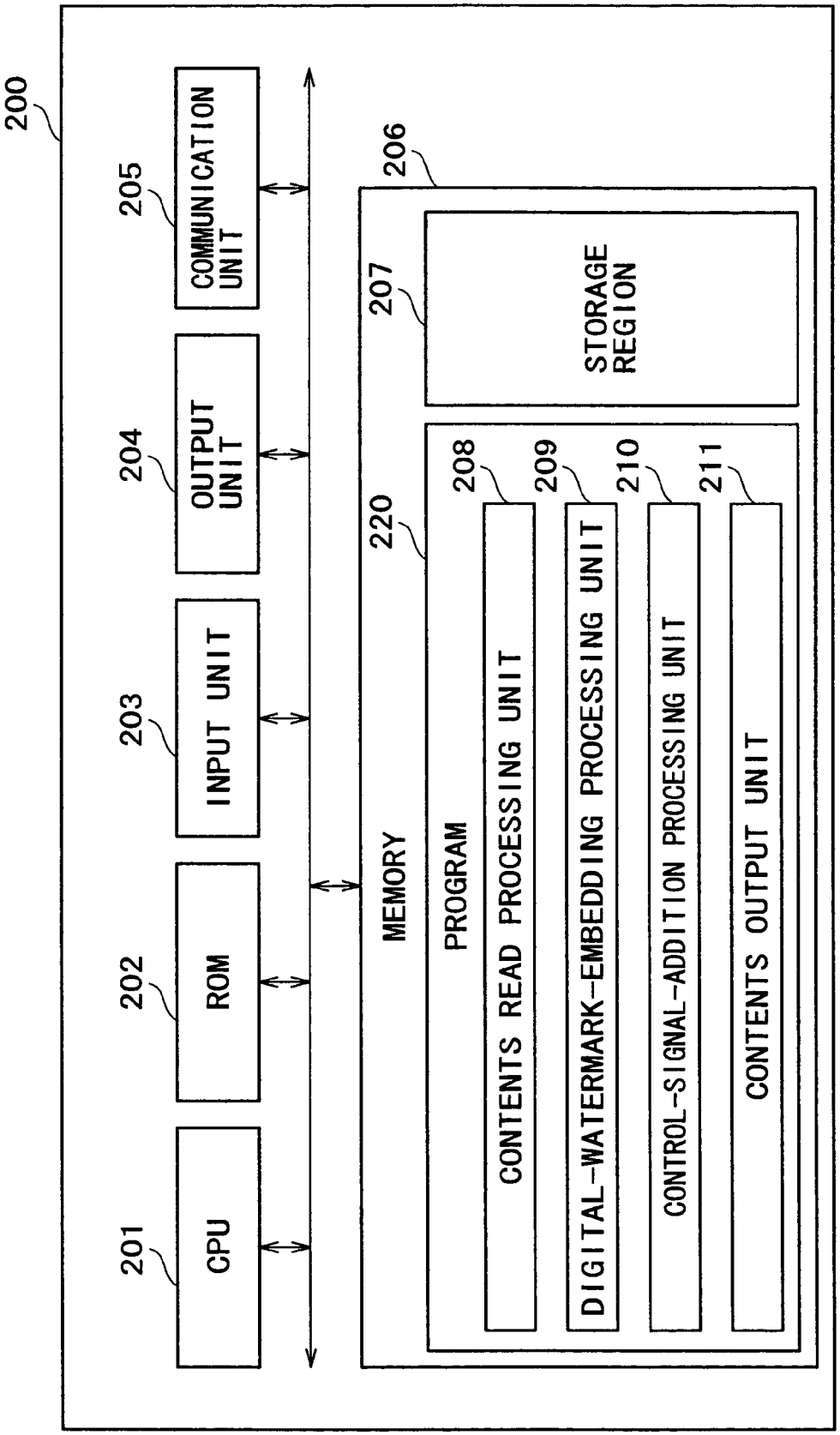

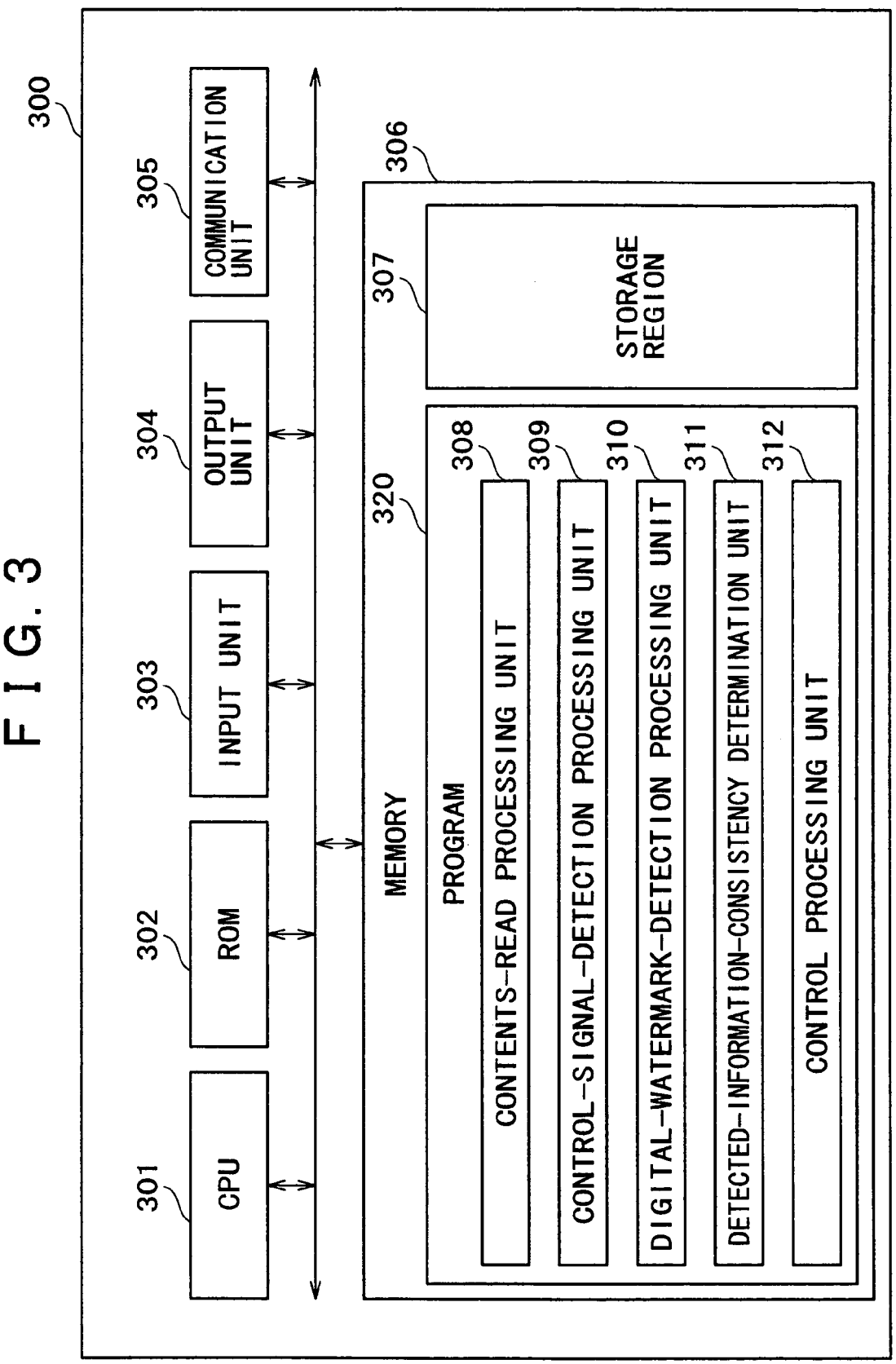

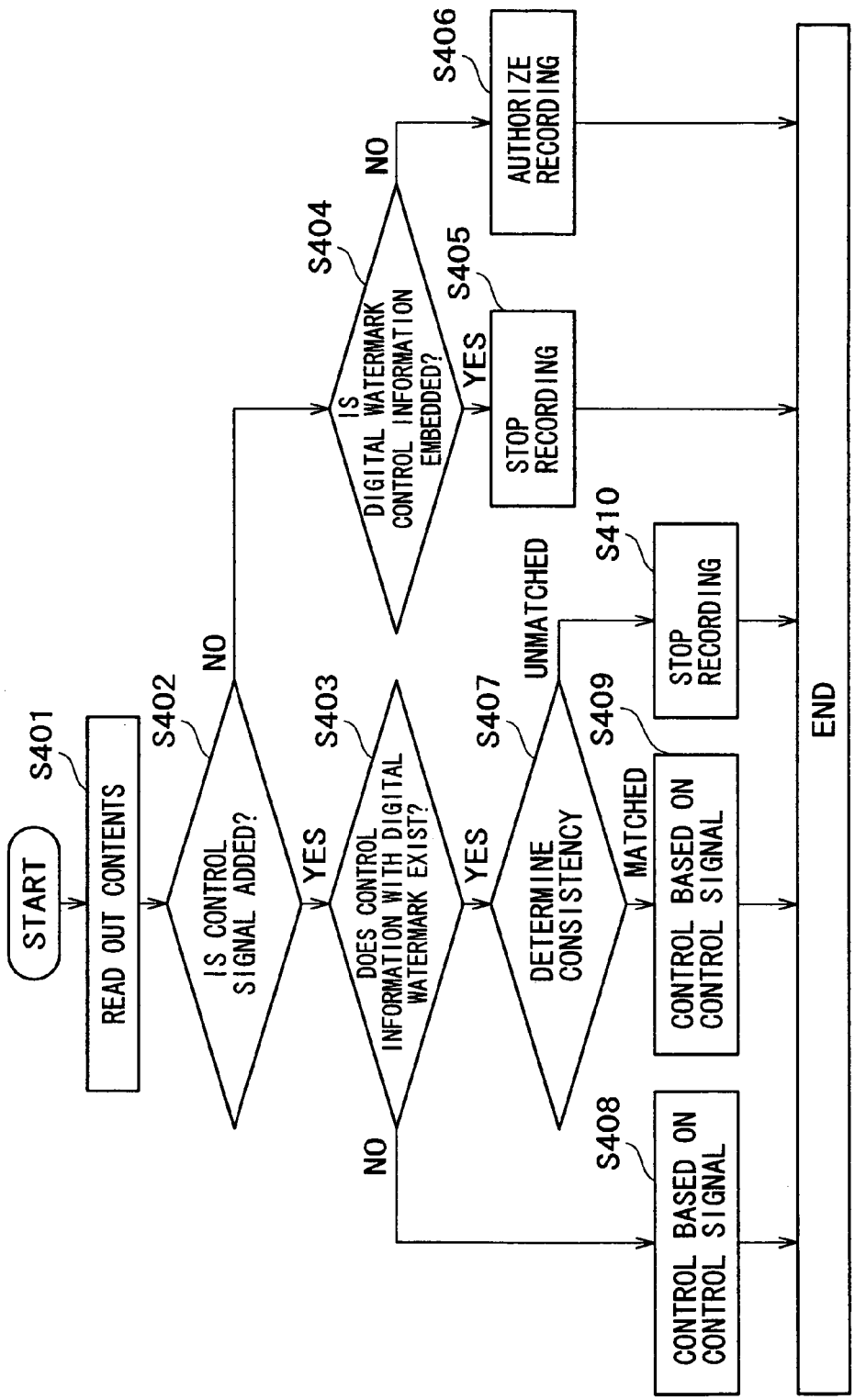

F I G. 5

| CONTROL SIGNAL \ DIGITAL WATERMARK CONTROL INFORMATION | YES | | | NO |
|---|---|---|---|---|
| | NEVER COPY | ONCE COPY | PROHIBIT REPEAT TRANSMISSION | |
| YES — NEVER COPY | MATCHED (STOP RECORDING) | UNMATCHED (STOP RECORDING) | UNMATCHED (STOP RECORDING) | BASED ON CONTROL SIGNAL (STOP RECORDING) |
| YES — ONCE COPY | UNMATCHED (STOP RECORDING) | MATCHED (AUTHORIZE RECORDING) | | BASED ON CONTROL SIGNAL (AUTHORIZE RECORDING) |
| YES — PROHIBIT REPEAT TRANSMISSION | | | MATCHED (AUTHORIZE RECORDING) | |
| NO | | | UNMATCHED (STOP RECORDING) | AUTHORIZE RECORDING |

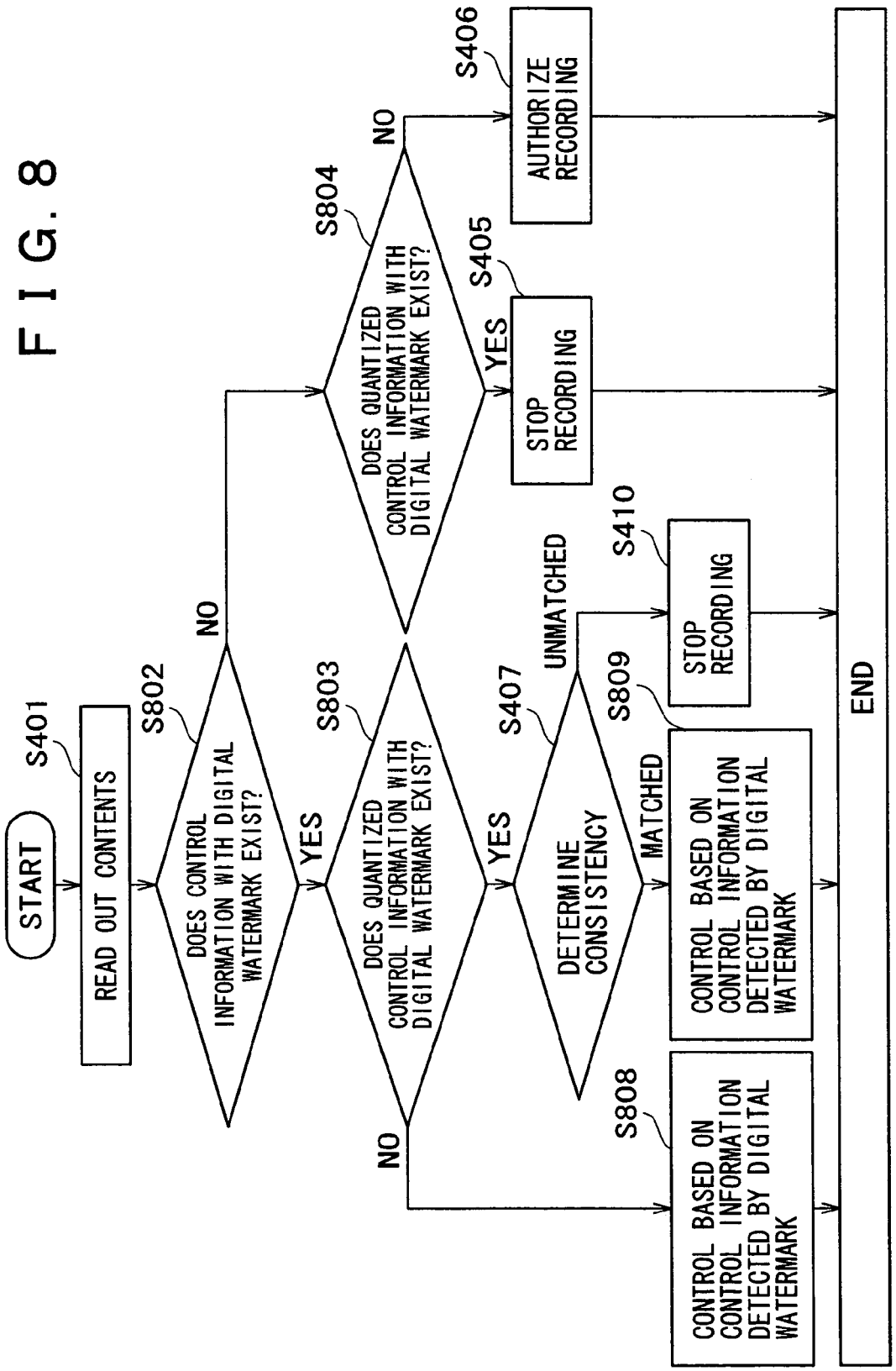

FIG. 9

| DIGITAL WATERMARK CONTROL INFORMATION \ DIGITAL WATERMARK QUANTIZED CONTROL INFORMATION | YES | | | NO |
|---|---|---|---|---|
| | NEVER COPY | ONCE COPY OR PROHIBIT REPEAT TRANSMISSION | NO | |
| YES | NEVER COPY | MATCHED (STOP RECORDING) | UNMATCHED (STOP RECORDING) | BASED ON CONTROL SIGNAL (STOP RECORDING) |
| | ONCE COPY / PROHIBIT REPEAT TRANSMISSION | UNMATCHED (STOP RECORDING) | MATCHED (AUTHORIZE RECORDING) | BASED ON CONTROL SIGNAL (AUTHORIZE RECORDING) |
| NO | | UNMATCHED (STOP RECORDING) | UNMATCHED (STOP RECORDING) | BASED ON CONTROL SIGNAL (AUTHORIZE RECORDING) |

FIG. 10

| DIGITAL WATERMARK QUANTIZED CONTROL INFORMATION / CONTROL SIGNAL | YES — NEVER COPY | YES — ONCE COPY OR PROHIBIT REPEAT TRANSMISSION | NO |
|---|---|---|---|
| YES — NEVER COPY | MATCHED (STOP RECORDING) | UNMATCHED (STOP RECORDING) | BASED ON CONTROL SIGNAL (STOP RECORDING) |
| YES — ONCE COPY / PROHIBIT REPEAT TRANSMISSION | UNMATCHED (STOP RECORDING) | MATCHED (AUTHORIZE RECORDING) | BASED ON CONTROL SIGNAL (AUTHORIZE RECORDING) |
| NO | UNMATCHED (STOP RECORDING) | UNMATCHED (STOP RECORDING) | BASED ON CONTROL SIGNAL (AUTHORIZE RECORDING) |

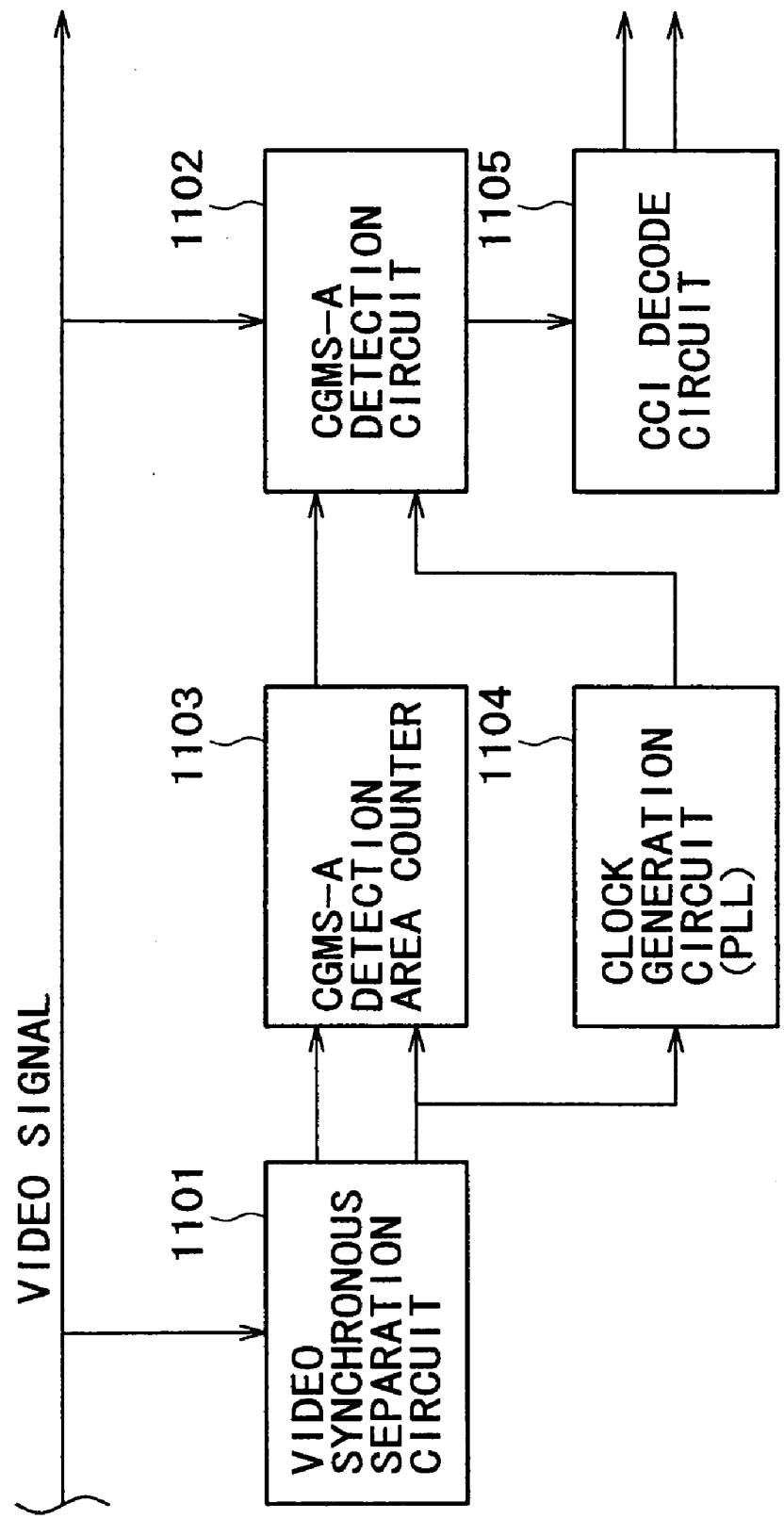

SYSTEM AND METHOD FOR CONTROLLING CONTENTS BY PLURALITY OF PIECES OF CONTROL INFORMATION

CLAIM OF PRIORITY

The present application claims priority from Japanese Patent Application Serial No. 2003-402400, filed on Dec. 2, 2003, the content of which is hereby incorporated by reference into this application.

BACKGROUND OF THE INVENTION

The present invention relates to a system and a method for controlling contents to thereby implement control of reproduction and storage of the contents, and is concerned with contents management techniques for controlling reproduction and storage of contents on the part of users, in particular, against the contents in distribution.

Up to now, digital contents (hereinafter referred to merely as contents), such as still picture data, video data, audio data, and so forth, have been made available to users through the intermediary of communications media such as Internet, digital broadcast, and so forth, or a medium such as a CD-ROM, DVD-ROM, and so forth. The contents described are characterized in that they can be copied with ease. It is therefore suspected that the contents can be improperly acquired by a third party.

For this reason, in Reference 1 described hereunder, the following techniques are disclosed as means for transmitting a control signal for contents, intended for copy control of DVD contents. More specifically, the techniques include:

(1) addition of a copy control signal to contents, according to the analog specification CGMS-A, and so forth, of CGMS (Copy Generation Management System)

(2) embedding of the copy control signal, in the contents, by a digital watermark Further, in Reference 2 described hereunder, there are disclosed the digital watermark management system wherein a plurality of pieces of information are embedded in contents by use of a plurality of digital watermarks for which endurances differ from each other, and when detecting the digital watermarks, the deterioration state of the contents is detected from the information embedded as detected, and the digital watermark management method.

Reference 1: "Copy Protection for DVD Video" by Jeffrey A Bloom, Ingemar J. Cox, Ton Kalker, Jean-Paul M. G. Linnartz, Mathew L. Miller, and Brendan S. Traw, Proceedings of the IEEE, Vol. 87, No. 7, pp. 1267-pp. 1276, July 1999

Reference 2: Japanese Published Unexamined Patent Application No. 2002-232693

SUMMARY OF THE INVENTION

With the conventional techniques (1) described in the Reference 1, there has been a possibility of copy control of contents being nullified without causing deterioration in contents quality or the contents being rewritten, by identifying a location where the control signal is added. Further, with the conventional techniques (2), there has been a possibility of control information embedded in the contents, by the digital watermark, being destroyed by applying geometric deformation or image processing to the contents.

Further, techniques described in the Reference 2 represent a method intended to detect the deterioration state of the contents, and there has been no description on the specific substance of information bits embedded by the digital watermark. No suggestion has been made to the effect that the techniques described in the Reference 2 is utilized for the purpose of copy control of contents with which the invention is concerned, and even if the conventional techniques described are applied by design to the copy control of the contents, the same lacks in specific means for implementation, including usage, because the specific substance of digital watermark information has not been disclosed.

As described above, with the conventional techniques concerning the copy control of the contents, it has been relatively easy to nullify the control signal, so that it has been possible to improperly copy the contents to be thereby distributed.

Hence, the technology of preventing improper copying with assurance of higher safety against such improper copying has been in great demand.

With the present invention, a plurality of pieces of control information added to contents by use of different methods, respectively, such as, for example, first control information and second control information, are detected, and consistency between the first control information as detected and the second control information as detected is determined, whereupon control of the contents is executed based on the results of determination.

A method of generating contents according to the present invention comprises a step of adding first control information concerning the control of the contents to contents data, a step of adding second control information concerning the control of the contents, differing in kind from the first control information, to the contents data, while keeping predetermined consistency with the first control information, and a step of outputting the contents provided with the first control information and the second control information.

In accordance with a first aspect of the present invention, there is provided a method for controlling contents data, comprising the step of detecting at least one kind of control signal concerning the control of the contents, added to specific locations inside the contents data, as the first control information, detecting at least one kind of control information concerning the control of the contents, embedded inside the contents data by a digital watermark, concerning the control of the contents, as the second control information, and determining consistency between the control signal added to the contents, as detected, and the control information embedded by the digital watermark, thereby executing the control of the contents on the basis of the results of the determination. Thus, by executing the control of the contents on the basis of the results of the determination on the consistency between the first control information and the second control information, it is possible to reduce a possibility of the contents being improperly copied, thereby inhibiting improper distribution thereof.

With the present invention in its second aspect, in addition to digital watermark embedding of copy control information for use as first control information against contents, there is embedded, by a digital watermark, quantized control information fewer in bit number than the first control information, or flag information for discriminating whether or not the digital watermark is embedded as second control information. As a result, it becomes possible to enhance endurance of the digital watermark, against media processing, such as conversion, various compressions, and so forth, in comparison with a digital watermark according to the conventional techniques. Further, the invention is characterized in that consistency between the control information and the quantized control information is determined on the part of a system for controlling contents, thereby implementing the control of the contents.

The second aspect of the invention is concerned with the system for controlling contents to thereby implement the control of reproduction and storage of the contents, and is characterized in that by use of the quantized control information fewer in bit number than the control information, or the flag information for discriminating whether or not the digital watermark is embedded, in addition to the control information as embedded information bits, consistency between both of the control information is determined on the part of the system for controlling contents, thereby implementing the control of the contents.

Further, the invention in its third aspect is characterized in that the quantized control information is embedded by a digital watermark in addition to copy control information according to CGMS, and so forth, against contents, and consistency between the control information and the quantized control information is determined on the part of the system for controlling contents, thereby implementing the control of the contents.

As for the number of combinations of the control information and the control information with the digital watermark or the number of combinations of pieces of the control information with different digital watermarks, respectively, one set each does not necessarily have to be combined. On the basis of a combination of at least one kind of control information and at least one kind of control information with a digital watermark or a combination of at least two kinds of control information with different digital watermarks, respectively, determination on consistency therebetween may be executed to thereby control the contents.

With the invention, by addition of a plurality of pieces of the control information, differing in kind, to the contents, while taking into account consistency therebetween, still higher safety can be assured, and improper control of the contents can be prevented.

BRIEF DESCRIPTION OF THE DRAWINGS

FIG. 1 is a block diagram broadly showing a configuration of an embodiment of a system for providing and utilizing contents according to the invention;

FIG. 2 is a block diagram broadly showing a configuration of a digital-watermark-embedding and control-signal-addition device 200 according to a first embodiment of the invention;

FIG. 3 is a block diagram broadly showing a configuration of a digital-watermark-detection and control-signal-detection device 300 according to the first embodiment of the invention;

FIG. 4 is flowchart showing an example of a processing procedure of the digital-watermark-detection and control-signal-detection device 300 according to the first embodiment;

FIG. 5 is a table showing a relationship among items at a time of determination on consistency between a control signal and control information according to the first embodiment;

FIG. 8 is flowchart showing an example of a processing procedure of the digital-watermark-embedding device 400 according to the second embodiment;

FIG. 9 is a table showing a relationship among items at a time of determination on consistency between a control signal and control information according to the second embodiment;

FIG. 10 is a table showing a relationship among items at a time of determination on consistency between a control signal and control information according to a third embodiment;

FIG. 11 is a circuit diagram showing a circuit configuration of a control-signal-detection processing unit 309 according to another embodiment of the invention;

DESCRIPTION OF THE PREFERRED EMBODIMENTS

Figure 6:
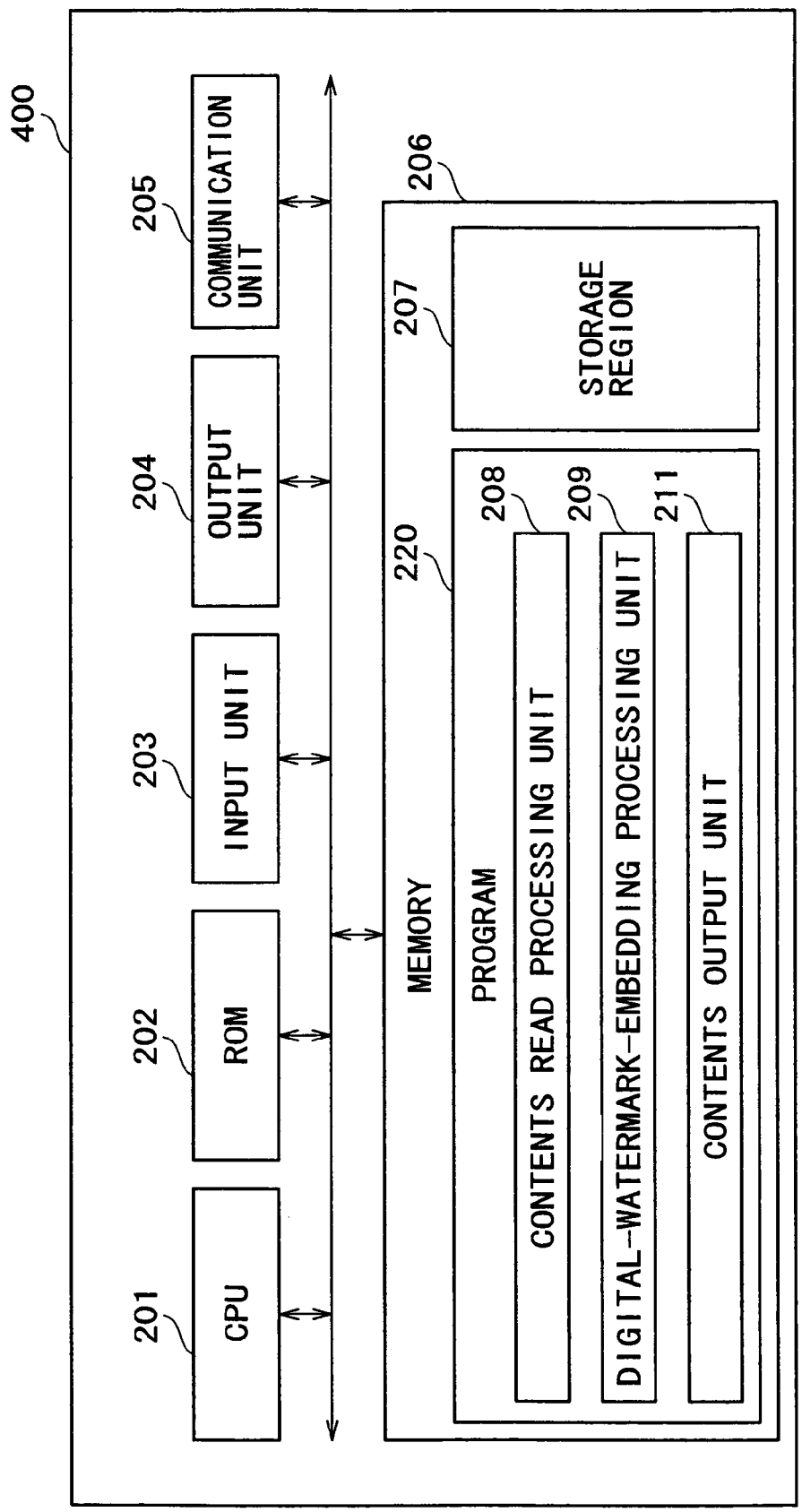
FIG. 6 is a block diagram broadly showing a configuration of a digital-watermark-embedding device according to a second embodiment of the invention.

Several embodiments of the invention are described hereinafter with reference to the accompanying drawings.

FIG. 1 is a block diagram broadly showing a configuration of an embodiment of the invention. As shown in FIG. 1, a method of distributing contents via broadcasting, packaging and a network is in the mainstream of a distribution method for contents, and a contents system to which the present invention is applied includes several digital-watermark-embedding control-signal-addition devices 200, and several digital-watermark-detection and control-signal-detection devices 300. The respective digital-watermark-embedding and control-signal-addition devices 200 are devices for executing embedding of digital watermark information in contents, and addition of a control signal to the contents at a time of generating the contents or at a time of distributing the contents, and are provided with functions of editing and distributing the contents. Means for distributing or delivering the contents include broadcasting, transmission to a network, recording in a DVD medium, and so forth.

In contrast, the respective digital-watermark-detection and control-signal-detection devices 300 are devices for executing detection of the digital watermark information, and the control signal as added against the contents at a time of regenerating the contents or at a time of receiving the contents, and are provided with a contents regeneration function and a contents receiving function, against which a function for digital-watermark-embedding and control-signal-addition is provided. On the part of users of the contents, use is made of means of regenerating and receiving the contents with the use of a Set Top Box, a DVD player, a PC, a PDA, and so forth.

FIG. 2 is a block diagram broadly showing a configuration of the digital-watermark-embedding and control-signal-addition device 200 according to the first embodiment of the invention. As shown in FIG. 2, the digital-watermark-embedding and control signal-addition device 200 can be made up with the use of an information processing apparatus having a CPU 201, a ROM 202, an input unit 203, an output unit 204, a communication unit 205, and a memory 206.

The CPU 201 is a device for controlling the operation of the digital-watermark-embedding and control-signal-addition device 200 in whole. The memory 206 is a recorder for storing various processing programs and data for controlling the operation of the digital-watermark-embedding and control-signal-addition device 200 as a whole at a time when controlling the operation of the same. The input unit 203 is a unit for executing various inputs for inputting the contents, such as, for example, a digital camera, a VCR, and a video system. The output unit 204 is a unit for executing various outputs in association with outputting of the contents, being a medium recorder such as, for example, a DV recorder, CD recorder, and so forth. The communication unit 205 is any of various apparatuses, for executing communication and control with other processors via a network such as Internet, Intranet, and so forth, or a special-purpose interface such as SCSI, RS-422, IEEE 1394, and so forth.

The digital-watermark-embedding and control-signal-addition device 200 encloses a contents read processing unit 208, a digital-watermark-embedding processing unit 209, a control-signal-addition processing unit 210, and a program 220 for implementing a contents output unit 211, inside the memory 206. The program 220 is executed by the CPU 201, thereby implementing these functions.

The contents read processing unit 208 reads out a partial region or the whole region of the contents from the input unit 203 and a storage region 207.

In the case of the partial region or the whole region of the contents, as read out, being a region where control information for controlling the processing object of the contents in the digital-watermark-detection and control-signal-detection device 300 is to be added, the digital-watermark-embedding processing unit 209 executes embedding of control information for controlling recording and regeneration of the contents, storage thereof in non-manipulation region, storage thereof in a manipulable region, display of accessory data accompanying the contents, selection of a transmitter of the contents, or duplex communication between a transmitter side and a receiver side, and information such as a user ID, a receiver side ID, the condition of user level information, the ID of the transmitter side of the contents, and so forth, in that region, as digital watermark information.

The control signal addition processing unit 210 is a processing unit wherein specific locations inside the contents such as header and footer executes addition of the control information for controlling recording and regeneration of the contents, storage thereof in non-manipulation region, storage thereof in a manipulable region, display of accessory data accompanying the contents, selection of a transmitter of the contents, or duplex communication between a transmitter side and a receiver side, and information such as a user ID, a receiver side ID, the condition of user level information, the ID of the transmitter side of the contents, and so forth, to the specific locations of the contents, in the region where the control information for controlling the processing substance of the contents, in the digital-watermark-detection and control-signal-detection device 300, is to be added.

With a processing procedure of the digital-watermark-embedding processing unit 209 and the control signal addition processing unit 210 according to the present embodiment, digital watermarking and embedding processing is executed first, and control signal addition processing is executed later, however, such processing does not necessarily have to be executed according to the processing procedure described, and the addition of the control signal may be executed first.

The contents output unit 211 sends out the contents with the control signal added thereto to the output unit 204. Further, there can be a case where the contents output unit 211 sends out contents without encryption, and watermarking and embedding (or either thereof) applied thereto, on the storage region 207, to the output unit 204.

FIG. 3 is a block diagram broadly showing a configuration of the digital-watermark-detection and control-signal-detection device 300 according to the first embodiment of the invention. As shown in FIG. 3, the digital-watermark-detection and control signal-detection device 300 can be made up with the use of an information processing apparatus having a CPU 301, a ROM 302, an input unit 303, an output unit 304, a communication unit 305, and a memory 306.

The CPU 301 is a device for controlling the operation of the digital-watermark-detection control-signal-detection device 300 as a whole. The memory 306 is a recorder for storing various processing programs and data for controlling the operation of the digital-watermark-detection and control-signal-detection device 300 in whole. The input unit 303 is a unit for executing various input operations for inputting the contents. The output unit 304 is a unit for executing various outputs in association with outputting of the contents. The communication unit 305 is any of various apparatuses, for executing communication and control with other processors via the network such as Internet, Intranet, and so forth, or the special-purpose interface such as SCSI, RS-422, IEEE 1394, and so forth.

The digital-watermark-detection and control signal-detection device 300 stores a program 320 for implementing a contents-read processing unit 308, a control-signal-detection processing unit 309, a digital-watermark-detection processing unit 310, a detected-information-consistency determination unit 311, and a control processing unit 312, by execution of the CPU 30, inside the memory 306. The program 320 is executed by the CPU 301, thereby implementing these functions.

The contents read processing unit 308 reads out a partial region or the whole region of the contents from the input unit 303 and a storage region 307.

In the case where the specific locations inside the contents, such as header and footer, as read out by the contents read processing unit 308, is in the region where the control information for controlling the processing substance of the contents, in the digital-watermark-detection and control-signal-detection device 300, is added, the control signal detection processing unit 309 detects the control information for controlling recording and regeneration of the contents, storage thereof in non-manipulation region, storage thereof in a manipulable region, display of accessory data accompanying the contents, selection of the transmitter of the contents, or duplex communication between the transmitter side and the receiver side, and control signals for the user ID, the receiver side ID, the condition of the user level information, the ID of the transmitter side of the contents, and so forth, from the specific locations of the contents, The digital-watermark-detection processing unit 310 executes detection processing of digital-watermarks from the partial region or the whole region of the contents, and if the partial region or the whole region of the contents is the region where the control information for controlling the processing object of the contents in the digital-watermark-detection and control-signal-detection device 300, is to be added, the digital-watermark-detection processing unit 310 detects the control information for controlling the recording and the regeneration of the contents, storage thereof in non-manipulation region, storage thereof in a manipulable region, display of the accessory data accompanying the contents, selection of the transmitter of the contents, or duplex communication between the transmitter side and the receiver side, and information such as the user ID, the receiver side ID, the condition of the user level information, the ID of the transmitter side of the contents, and so forth, as the digital watermark information.

With a processing procedure of the control-signal-detection processing unit 309 and the digital-watermark-detection processing unit 310 according to the present embodiment, control-signal-detection processing is executed first, and control information detection processing with the digital watermark is executed later, however, such processing does not necessarily have to be executed according to the processing procedure described, and the control information detection processing with the watermark may be executed first.

The detected-information consistency-determination unit 311 determines consistency between the control information detected from the contents by the control-signal-detection processing unit 309 and the control information detected from the contents by the digital-watermark-detection processing unit 310, and decides a processing instruction against the control-processing unit 312 on the basis of the results of determination.

The control-processing unit 312 receives an instruction for execution of the regeneration of the contents, copying of the contents, storage thereof in the non-manipulation region, storage thereof in the manipulable region, display of the accessory data accompanying the contents, selection of the transmitter of the contents, or duplex communication between the transmitter side and the receiver side from the detected-information consistency-determination unit 311 as the processing instruction against the contents, thereby executing the instruction as received against the contents.

With the present embodiment, and second and third embodiments, which will be described later, the respective programs described above are normally recorded in a record medium such as a CD-ROM and so forth, which can be used by an information processing apparatus such as a PC and so forth. When control of the contents is required with the digital-watermark-embedding and control-signal-addition device 200 or the digital-watermark-detection and control-signal-detection device 300, the programs recorded in the record medium are installed and stored in a magnetic disk (not shown) of an information processing apparatus making up the digital-watermark-embedding and control-signal-addition device 200 or the digital-watermark-detection and control-signal-detection device 300, and subsequently, are loaded in the memory 206 or the memory 306. Needless to say, access to the record medium may be gained through a network to thereby make use of the programs. Further, by utilizing a network which the information processing apparatus can make use of from an outside server or by utilizing a carrier wave propagating over a network, the programs may be loaded in the memory 206 or the memory 306. Furthermore, the respective programs described above are not necessarily implemented by software, and may be implemented by hardware of a circuit configuration such as an FPGA, and so forth.

Now, an operation of executing addition and detection of the control signal against contents is described hereinafter.

Figure 14:
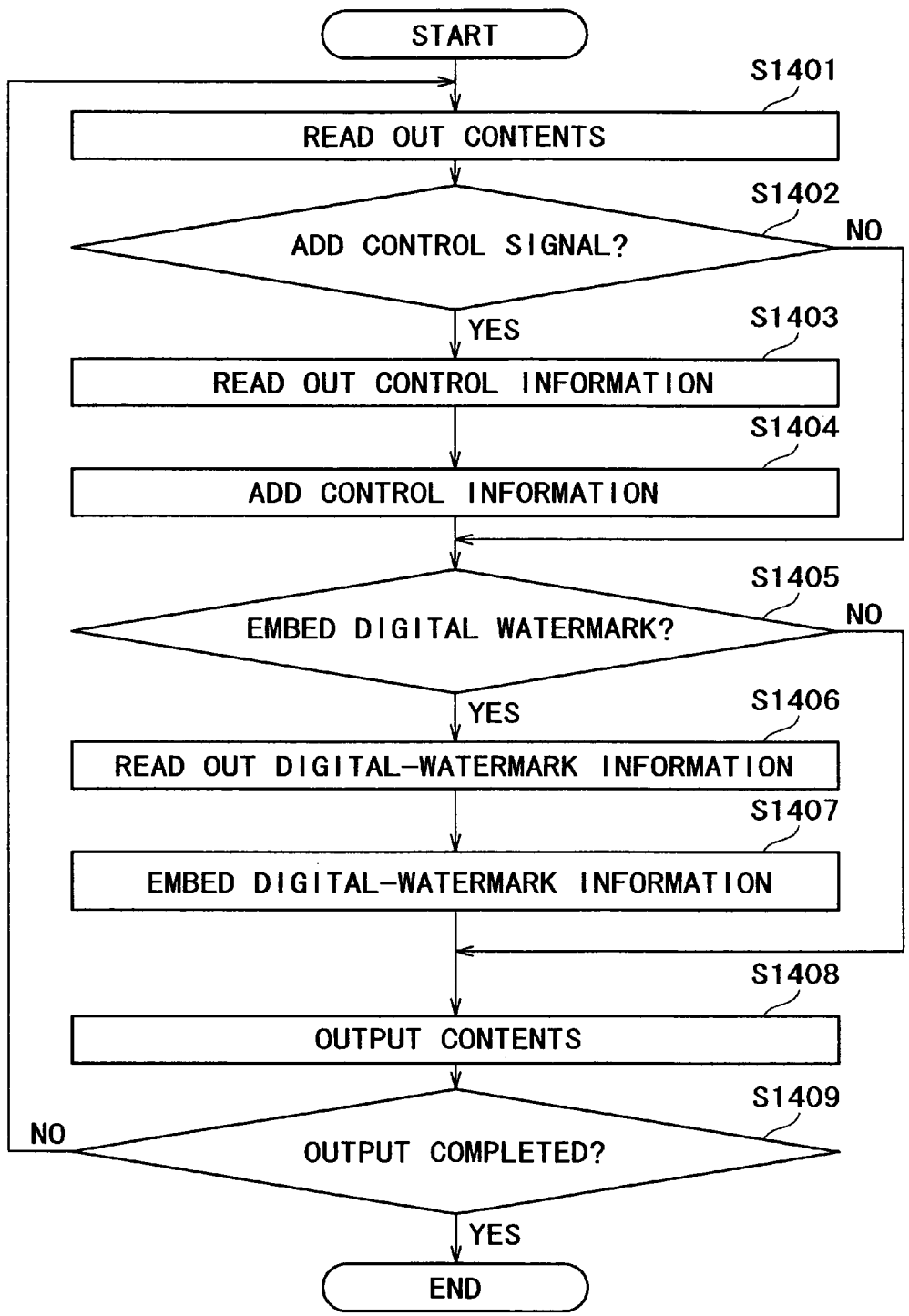
FIG. 14 is a flowchart showing a processing operation of a digital-watermark-embedding and control-signal-addition device 200 according to an embodiment of the invention.

First, a processing procedure of the digital-watermark-embedding and control-signal-addition device 200 is described with reference to a flowchart shown in FIG. 14.

When it is time to start outputting certain contents by referring to data indicating an output schedule of contents, or upon receiving an instruction for outputting contents from an operator, the digital-watermark-embedding and control-signal-addition device 200 executes output processing of the contents. As for the output processing of the contents, there are assumed a case of executing the output processing of the contents concurrently with image pickup thereof, for example, like the case where the input unit 203 for the contents is an image pickup apparatus (camera), and a case of executing the output processing after storing once the image thereof as picked up in the storage region 207 by means of a contents storage inside the image pickup apparatus.

In a step S1401, the contents read processing unit 208 of the digital-watermark-embedding and control-signal-addition device 200 reads the contents from a memory, such as a magnetic disk, and so forth, for storing contents, and an external memory, or from a sound recorder, a video recorder (camera), and so forth, for recording contents in real time.

In a step S1402, the control-signal-addition processing unit 210 determines whether or not there is the need for adding a control signal to the contents as read, and if the contents as read are in a region where the control signals to be added, the operation proceeds to a step S1403.

In the step S1403 and a step S1404, the control-signal-addition processing unit 210 reads the control information for controlling the recording and regeneration of the contents, storage thereof in a non-manipulation region, storage thereof in a manipulable region, display of accessory data accompanying the contents, selection of a transmitter of the contents, or duplex communication between the transmitter side and the receiver side, and the information such as the user ID, the receiver side ID, the condition of the user level information, the ID of the transmitter side of the contents, and so forth, which are thereby added as the control signal to the specific locations of the contents.

In a step S1405, the digital-watermark-embedding processing unit 209 determines whether or not there is the need for embedding a digital watermark in the contents, as read, and if embedding is required, the operation proceeds to a step S1406.

In the step S1406 and a step S1407, the digital-watermark-embedding processing unit 209 reads the control information for controlling the recording and regeneration of the contents, storage thereof in a non-manipulation region, storage thereof in a manipulable region, display of accessory data accompanying the contents, selection of a transmitter of the contents, or duplex communication between the transmitter side and the receiver side, and the information such as the user ID, the receiver side ID, the condition of the user level information, the ID of the transmitter side of the contents, and so forth, as digital-watermark information, in a state of maintaining consistency with the control signal, thereby embedding a digital watermark in a region of the contents.

In the step S1408, the contents output unit 211 transmits the contents, with the control signal and the digital watermark, added thereto by the control-signal-addition processing unit 210 and the digital-watermark-embedding processing unit 209, to the output unit 204, and if, upon confirmation of output completion in a step S1409, outputting of the contents is completed, the processing by the digital-watermark-embedding and control-signal-addition device 200 is completed.

By so doing, there is prepared and produced a record medium, such as, for example, DVD, CD, and so forth, wherein contents, with a control signal and a digital watermark, added thereto, are recorded. Further, the contents processed as above can be broadcast or distributed via a network.

FIG. 4 is flowchart showing a processing procedure of the digital-watermark-detection and control-signal-detection device 300. With the following examples, there is described a specific example of contents control in the case of recording the substance of contents in a record medium or recorder.

First, the contents-read processing unit 308 of the digital-watermark-detection and control signal-detection device 300 reads the contents from the memory, such as the magnetic disk, and so forth, for storing contents, and the external memory, or from the sound recorder, the video recorder (camera), and so forth, for recording contents in real time via the digital-watermark-embedding and control-signal-addition device 200 (step S401).

Next, the control-signal-detection processing unit 309 examines whether or not the control signal for the contents is added to specific locations such as header, footer, and so forth, inside the contents as read (step S402). Consequently, if the control signal is not found added thereto, the digital-watermark-detection processing unit 310 examines whether or not the control information is embedded in the contents (step S404). Consequently, if the control information is not embedded, the detected-information-consistency determination unit 311 determines that record control of the contents is unnecessary, and recording of the contents is authorized by the control-processing unit 312 (step S406).

Meanwhile, if the control information is found embedded in the step S404, the detected-information-consistency determination unit 311 determines that information concerning record control of the contents is inconsistent (the control signal addition: No, watermark information: Yes) because the control signal involved in the control is added without fail to the contents with the control information embedded therein by the digital watermark, and the control-processing unit 312 determines that the contents represent improper contents, thereby stopping recording (step S405).

If the control-signal-detection processing unit 309 determines that the control signal is added in the step S402, the digital-watermark-detection processing unit 310 examines whether or not the control information is embedded in the contents (step S403). Consequently, if the control information is not embedded, the detected-information-consistency determination unit 311 determines that the embedding of the control information by the digital watermark is not executed from the outset. Accordingly, it is determined that the information concerning the record control of the contents is inconsistent (the control signal addition: Yes, watermark information: No), so that the record control of the contents, based on the control signal added, is executed by the control-processing unit 312 (step S408).

Meanwhile, if the control information is found embedded in the step S403, the detected-information-consistency determination unit 311 executes determination on consistency between the substance of the control signal added to the contents and the substance of the control information detected by the digital watermark (step S407). As a result of the determination described, if the respective substances of both of the control information are found to match or related to each other, it is determined that information concerning the record control of the contents is consistent, and the record control of the contents, based on the substance of the control information, is executed by the control-processing unit 312 (step S409). As a result of the determination described (the step S407), if the respective substances of both the control information are found not to match or unrelated to each other, it is determined that the information concerning the record control of the contents is inconsistent, and the control-processing unit 312 deems that the contents represent improper contents, thereby stopping recording (step S410).

In the flowchart as described above, as for the detection of the control signal in the step S402, and the detection of the control information with the digital watermark in the steps S403 and S404, respectively, it is to be pointed out that the detection of the control signal does not necessarily have to be executed first, but digital watermark detection processing may be executed first instead.

FIG. 5 is a table showing a relationship among items within the substance of the determination by the detected-information-consistency determination unit 311 during control operation of contents. In FIG. 5, three kinds of record controls, namely, Never Copy (copying inhibit), Once Copy (a first generation copy permitted), and repeat transmission inhibit, are cited by way of example.

As shown in FIG. 5, if neither the control information with the digital watermark nor the control signal is detected, it is determined that the record control of the contents is unnecessary, and recording of the contents is authorized. Further, if the control signal is detected although the control information with the digital watermark is not detected, it is determined that the embedding of the control information by the digital watermark is not executed from the outset, and the record control of the contents is executed based on the control signal. On the other hand, if both the control information with the digital watermark and the control signal are detected, consistency between the substance of the control signal recorded, added to the contents, and the substance of the control information recorded, detected by the digital watermark, is determined, and if both the substances match, the record control of the contents is executed based on the control information as matched while if both the substances do not match, it is determined that impropriety is applied to the contents, thereby stopping recording of the contents.

Subsequently, a second embodiment of the invention is described hereinafter. The second embodiment is characterized in that, in addition to digital watermark embedding of the control information against contents, there is embedded quantized control information fewer in bit number than the control information, or flag information for discriminating whether or not the digital watermark is embedded. As a result, it becomes possible to enhance endurance of the digital watermark, against media processing, such as conversion, various compressions, and so forth, in comparison with the digital watermark implemented according to the prior art (2). Further, the second embodiment is characterized in that consistency between the control information and the quantized control information is determined on the part of a system for contents control, thereby implementing control.

FIG. 6 is a block diagram broadly showing a configuration of a digital-watermark-embedding device 400 according to the second embodiment of the invention. The digital-watermark-embedding device 400 as shown in FIG. 6 is the same in configuration as the digital-watermark-embedding control signal-addition device 200 (FIG. 2) except that the control-signal-addition processing unit 210 is removed therefrom. However, with a digital-watermark-embedding processing unit 209, in addition to the embedding of control information, in the contents, by a digital watermark, the quantized control information fewer in bit number than the control information is embedded with a digital watermark. In that sense, two kinds of the control information for record control are embedded, and by detecting these pieces of control information, various control are executed.

Figure 7:
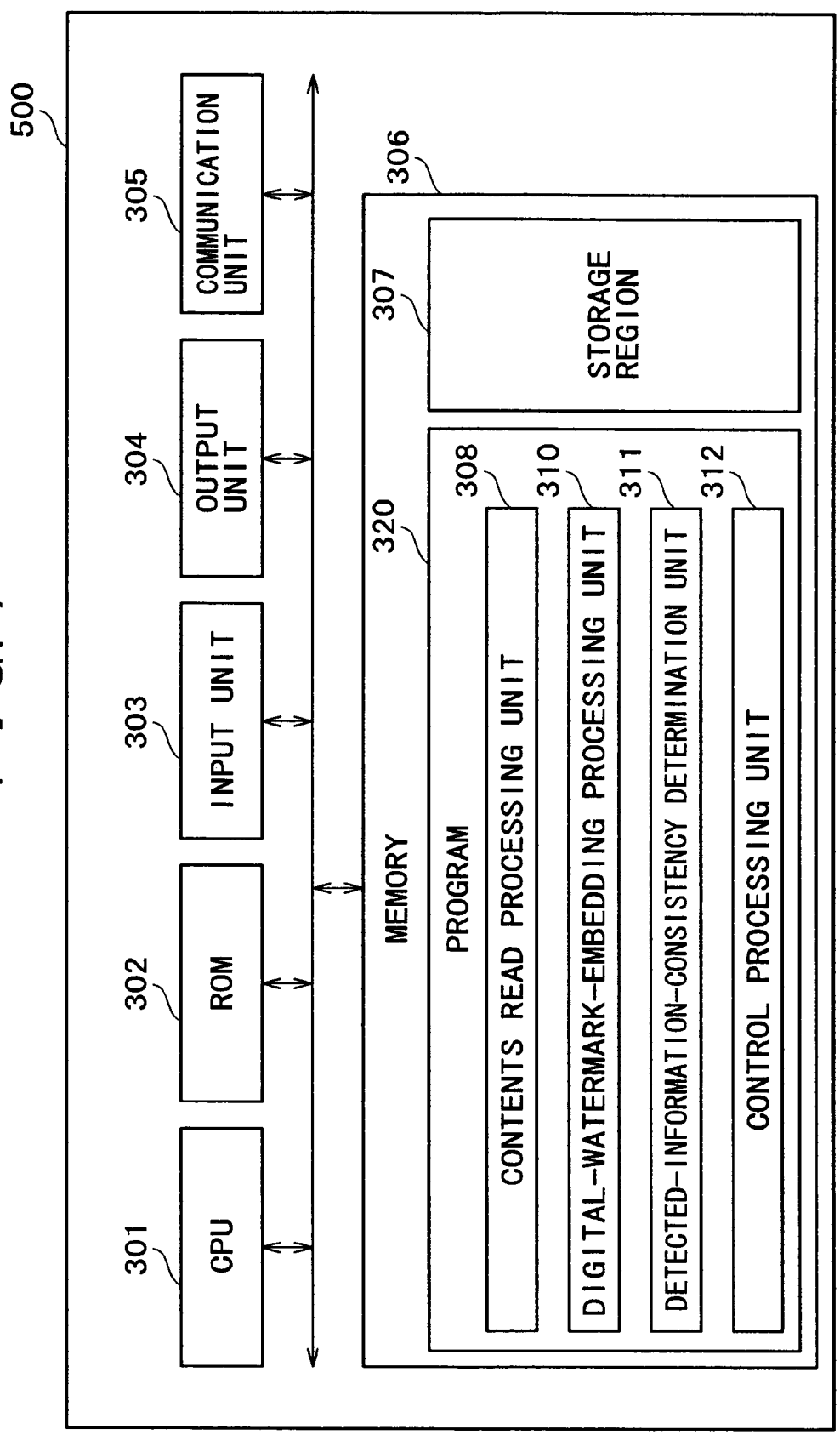
FIG. 7 is a block diagram broadly showing a configuration of a digital watermark detection device according to the second embodiment of the invention.

FIG. 7 is a block diagram broadly showing a configuration of a digital watermark detection device 500 according to the second embodiment of the invention. The digital watermark detection device 500 as shown in FIG. 7 is the same in configuration as the digital-watermark-detection control-signal-detection device 300 described with reference to the first embodiment of the invention except that the control-signal-detection processing unit 309 is removed therefrom. A digital-watermark-detection processing unit 310 executes detection of the control information by the digital watermark, and detection of the quantized control information fewer in bit number than the control information by the other digital watermark against the contents.

FIG. 8 is flowchart showing a processing procedure of the digital watermark detection device 500. The flowchart shown in FIG. 8, showing the processing procedure of the digital watermark detection device 500, differs in the following respect from the flowchart (FIG. 4) showing the processing procedure of the digital-watermark-detection and control-signal-detection device 300, described with reference to the first embodiment of the invention. More specifically, the flowchart shown in FIG. 8 can be implemented by substituting processing (step S802) of determining whether or not the control information with the digital watermark exists for processing of determining whether or not the control signal exists in the step S402, substituting processing (steps S803, S804) of determining whether or not the quantized control information with the digital watermark exists for processing of determining whether or not the control information by the digital watermark exists in the steps S403 and S404, respectively, and substituting control based on the control information detected by the digital watermark (steps S808, S809) for the record based on the control signal, executed in the steps S408, and S409.

FIG. 9 is a table showing a relationship among items for the determination by the detected-information-consistency determination unit 311 during the control operation of the contents. As with the case in FIG. 5, in FIG. 9, three kinds of record controls, namely, Never Copy (copying inhibit), Once Copy (a first generation copy permitted), and repeat transmission inhibit, are cited by way of example. In this connection, in order to allocate three kinds of the record controls for the control information with the digital watermark, at least two bits or more are required.

With this example, however, a case is cited where use is made of the quantized control information of 1 bit, as control information fewer in bit numbers than the number of bits (2 bits) for the control information described above. In this case, since it is impossible to express the three kinds of the record controls with 1 bit, it is decided that 1-bit information is preferentially allocated to a record control of which high precision is required, and duplication in allocation to the other record control is permitted. For example, one bit value ("1" or "0") of 1 bit is preferentially allocated to Never Copy while the other bit value ("0" or "1") is allocated to Once Copy, and repeat transmission inhibit. That is, the other bit value is allocated to two kinds of modes, a Once Copy mode, and a repeat transmission inhibit mode, permitting duplication. Thus, with the use of the quantized control information of 1 bit for one piece of control information of plural kinds of control information, used for control of the contents, the control of the contents can be executed by control information with the minimum number of bits.

As shown in FIG. 9, if neither the control information with the digital watermark nor the quantized control information with the digital watermark is detected, it is determined that the record control of the contents is unnecessary, and recording of the contents is authorized. Further, if the quantized control information with the digital watermark is not detected although the control information with the digital watermark is detected, it is determined that the embedding of the quantized control information with the digital watermark in the contents is not executed from the outset, and the record control based on the control signal is executed.

On the other hand, if both the control information with the digital watermark and the quantized control information by the digital watermark are detected, consistency between the substance of the record control signal added to the contents, and the substance of the record control information detected with the digital watermark is determined as with the case shown in FIG. 5, but because Once Copy and repeat transmission inhibit are allocated to one bit value in duplication over the quantized control information, the record control is executed based on the control information not quantized (the vertical axis in the figure).

It has thus far been described that the control of the contents is implemented by software based on the control information, however, it is possible to implement part of control operation with hardware. As an example of such a case, there is described hereinafter a case where the control-signal-detection processing unit 309, and the digital-watermark-detection processing unit 310, in the case of a video signal being target contents, are configured with circuits, thereby implementing the digital-watermark-detection and control-signal-detection device 300.

FIG. 11 is a circuit diagram showing a circuit configuration of the control-signal-detection processing unit 309 according to the analog specification CGMS-A of CGMS (Copy Generation Management System. As shown in FIG. 11, an input video signal generates a regeneration signal in sync with a CGMS-A signal by a clock generation circuit 1104 after a synchronous signal is separated therefrom by a video synchronous separation circuit 1101, and a CGMS-A detection area counter 1103 selects a signal area where the CGMS-A signal is recorded, thereby separating a region with the control signal added thereto from a data region. A CGMS-A detection circuit 1102 executes detection of the CGMS-A signal recorded on a specific line. The CGMS-A signal as detected is fetched as respective copy control signals by a CCI decode circuit 1105.

Figure 12:
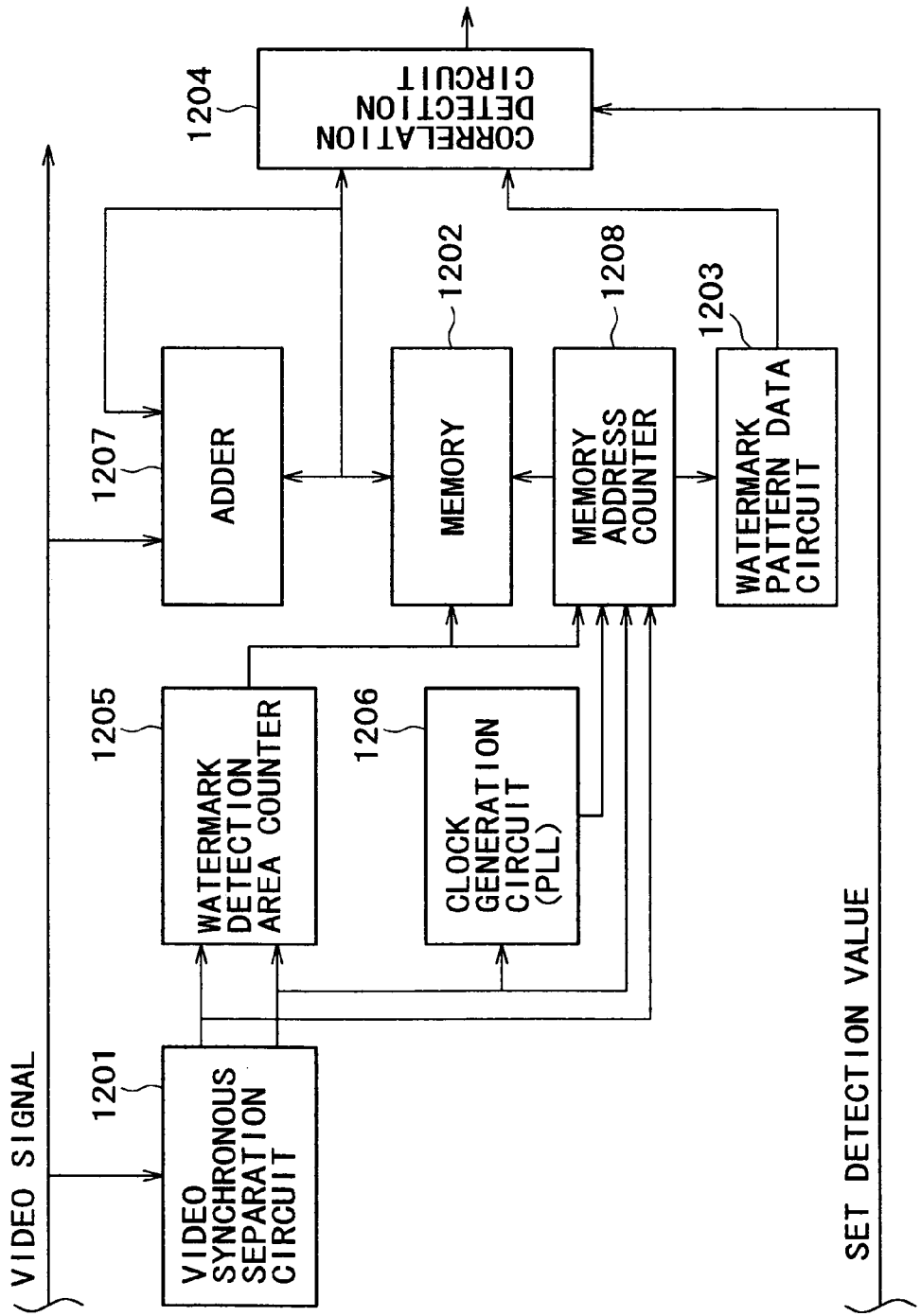
FIG. 12 is a circuit diagram showing a circuit configuration of a digital-watermark-detection processing unit 310 according to still another embodiment of the invention.

FIG. 12 is a circuit diagram showing a circuit configuration of the digital-watermark-detection processing unit 310. As shown in FIG. 12, on the basis of a synchronous signal separated from an inputted video signal by a video synchronous separation circuit 1201, a signal region with the digital watermark embedded therein is stored in a memory 1202 by a clock generated by a clock generation circuit 1206, and a signal identifying a record area, obtained by a coefficient of a watermark detection area counter 1205. Since a digital watermark signal is generally recorded in a plurality of areas of a screen, while addition is executed in a memory address counter 1208 such that only a watermark component is highlighted by repeatedly superimposing and adding data stored in the memory 1202 via an adder 1207, the digital watermark signals continue to be added to the memory 1202. Upon completion of the integration in the screen, a detection operation starts. In detection, calculation of correlation between the signal region stored in the memory 1202 and a watermark pattern data is executed, and a correlation value as calculated is compared with a set detection value by a correlation detection circuit 1204, thereby outputting a CCI (copy control signal) value recorded in the digital watermark.

Figure 13:
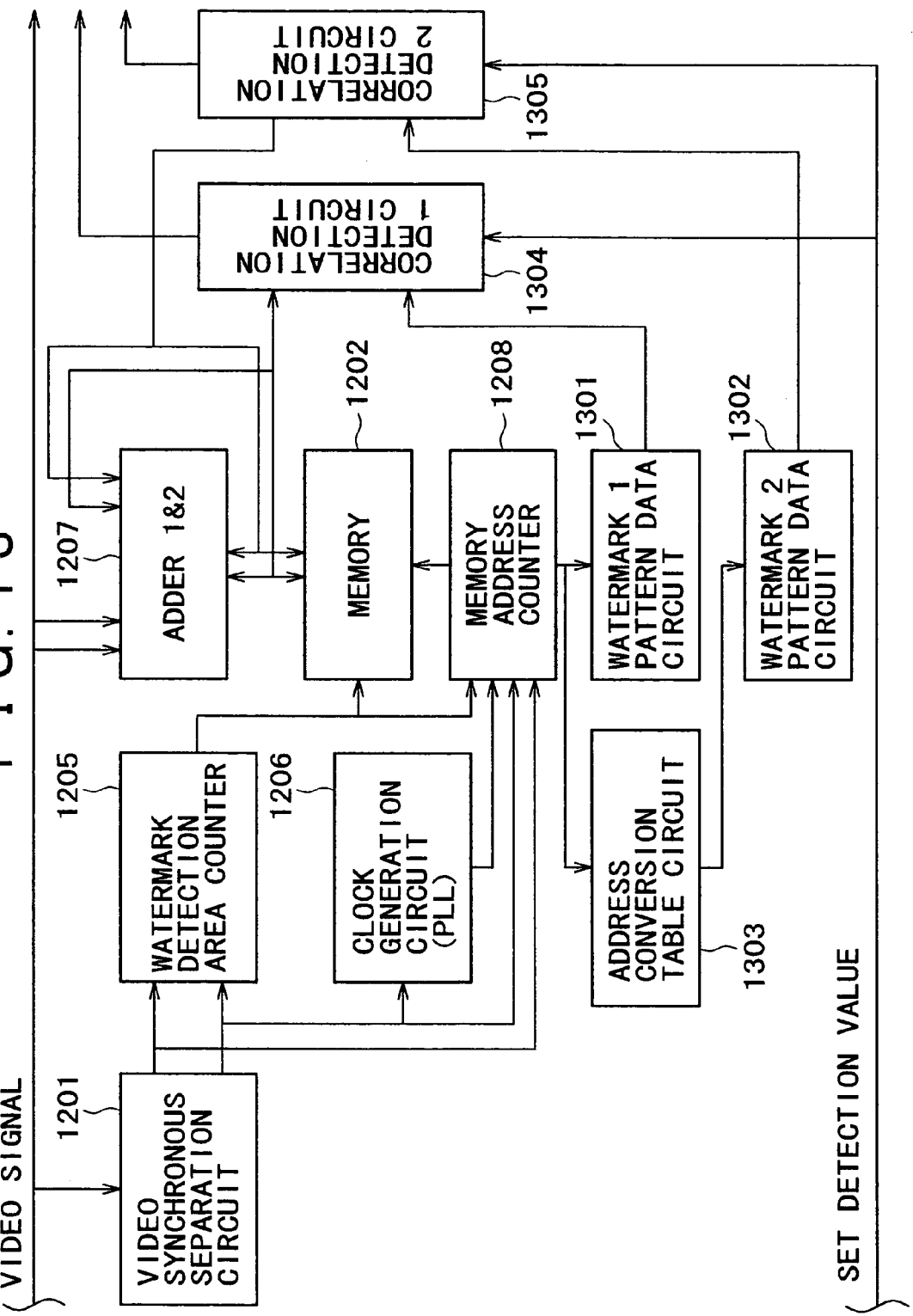
FIG. 13 is a circuit diagram showing a circuit configuration of a digital-watermark-detection processing unit according to yet another embodiment, showing a case where the digital-watermark-detection processing unit 209 according to the second embodiment is implemented as the circuit configuration.

FIG. 13 is a circuit diagram showing a circuit configuration of a digital-watermark-detection processing unit according to still another embodiment, showing a case where the circuit configuration of the digital-watermark-detection processing unit 209 according to the second embodiment is implemented, that is, the circuit configuration of the digital-watermark-detection processing unit 310 described with reference to FIG. 6 making use of a plurality of digital watermarks (a digital watermark where control information is embedded and a digital watermark where quantized control information fewer in bit number than the control information is embedded).

The circuit shown in FIG. 13 differs in circuit configuration from the circuit shown in FIG. 12 in that the circuit configuration of the former comprises a plurality of watermark pattern data circuits (watermark 1 pattern data circuit 1301, and watermark 2 pattern data circuit 1302) in a detection circuit while sharing a memory 1202 for integrating watermarks, thereby outputting respective correlation values according to the respective watermark patterns against an identical video signal. In the figure, parts corresponding to those parts in FIG. 12 operate in the same way as those parts. A plurality of digital watermark signals are embedded at different locations in a screen, respectively, or embedded so as to partially overlap each other. Accordingly, when integrating the watermarks in the memory, a watermark detection area circuit identifies locations corresponding to the locations where the respective watermarks are recorded, thereby integrating the watermark signals on the memory. In connection with the integration of the watermarks in the memory, description is given herein on the basis of a configuration wherein the watermarks are independently integrated by use of the different locations on the memory, however, in the case of the watermark signals being embedded in the screen so as to partially overlap each other, the integration is executed sharing the same area in the memory, and the detection of the watermarks is executed in circuits 1304, 1305 by reading the watermark signals corresponding to respective sizes thereof at a time of read-out.

In connection with the detection of the watermarks, if the digital watermark signals are embedded at the different locations, respectively, or embedded so as to partially overlap each other, in the screen, record locations in the memory differ from each other, so that there is the need for compensating for a deviation amount by converting a read address of one of the record locations in order to eliminate the deviation amount. A unit for compensating for the deviation amount is an address conversion table circuit. Among addresses generated by a memory address counter circuit, a circuit for reading a portion of the addresses, recording data for Watermark 2, is shifted by the address conversion table circuit 1303. By so doing, correlation concerning the watermark 1 pattern data is detected by a correlation detection 1 circuit 1304, and correlation concerning the watermark 2 pattern data is detected by a correlation detection 2 circuit 1305.

Further, with the present embodiment, the address of reference data is converted, however, unless concurrent detection of two Watermarks is required, it is also possible to detect Watermarks in sequence by changing over respective outputs of the watermark pattern data circuits. By so doing, it need only be sufficient to have one correlation detection circuit, thereby simplifying address setting, and at the same time, the circuit in whole is rendered simple with the one correlation detection circuit. Further, the same results can be obtained even if conversion is executed by locating the address conversion table circuit in the address of the memory, as means for compensating for a deviation amount, instead of locating the same in the respective addresses of the watermark pattern data circuits.

Now, a third embodiment of the invention is described hereinafter. The third embodiment of the invention is characterized in that, in addition to adding the control information to contents, the quantized control information, or the flag information for discriminating whether or not the digital watermark is embedded, as described with reference to the second embodiment, is embedded with a digital watermark. Further, the third embodiment is characterized in that consistency between the control information and the quantized control information is determined on the part of a system for contents control, thereby implementing control.

A digital-watermark-embedding and control-signal-addition device and a digital-watermark-detection and control-signal-detection device, according to the third embodiment of the invention, are the same in broad configuration as the digital-watermark-embedding and control-signal-addition device 200 (FIG. 2) and the digital-watermark-detection and control-signal-detection device 300 (FIG. 3) described with reference to the first embodiment of the invention respectively, except that information embedded by a digital watermark is the quantized control information described with reference to the second embodiment. Similarly, a flowchart showing a processing procedure of the digital-watermark-detection and control-signal-detection device according to the resent embodiment is the same as the flowchart described with reference to the first embodiment except that information detected by the digital watermark is the quantized control information described with reference to the second embodiment.

FIG. 10 is a table showing a relationship among items for determination by a detected-information-consistency determination unit according to the third embodiment of the invention. The substance of the determination in FIG. 10 is the same as that in FIG. 9, and record control can be implemented by substituting a control signal for the control information with the digital watermark (the vertical axis in FIG. 9). The detailed substance of the determination in FIG. 10 is the same as that described with reference to FIG. 9, and the record control can be implemented by substituting the control signal for the control information with the digital watermark.

What is claimed is:

1. A method for controlling contents data, said method comprising:
   obtaining the contents data by an input unit in a detection device including a storage device for recording a new copy of the contents data;
   detecting, by a processing unit in the detection device, first control information concerning control of contents from the contents data;
   detecting, by the processing unit, second control information concerning the control of the contents from the contents data, the second control information being added to the contents data in a manner different from the first control information;
   determining, by the processing unit, consistency between the control of the first control information and the control of the second control information; and
   executing, by the processing unit, the control of the contents on the basis of the first control information or the second control information, in accordance with results of the determination on the consistency, wherein:
   the executing step by the processing unit includes recording a new copy of the received contents data in the storage device in accordance with the determination results;
   an information amount of the first control information differs from an information amount of the second control information;
   the second control information is quantized control information of 1 bit; and
   in connection with the second control information of 1 bit, one bit value of 1-bit values is allocated to a record control required for control of the contents, another bit value is allocated to other record controls by permitting duplication in allocation, and as a result of the determination on consistency between the first control information and the second control information of 1 bit, the control of the contents is executed based on the first control information.

2. A method for controlling contents data, said method comprising:

obtaining the contents data by an input unit in a detection device including a storage device for recording a new copy of the contents data;

detecting, by a processing unit in the detection device, first control information concerning control of contents from the contents data;

detecting, by the processing unit, second control information concerning the control of the contents from the contents data, the second control information being added to the contents data in a manner different from the first control information;

determining, by the processing unit, consistency between the control of the first control information and the control of the second control information; and executing, by the processing unit, the control of the contents on the basis of the first control information or the second control information, in accordance with results of the determination on the consistency, wherein:

the executing step by the processing unit includes recording a new copy of the received contents data in the storage device in accordance with the determination results;

the first control information is at least one kind of control signal concerning the control of the contents, added to specific locations inside the contents data, the second control information is at least one kind of control information concerning control of the contents, embedded inside the contents data by a digital watermark, and consistency between the control signal as detected and the control information as detected by the digital watermark is determined at a time of the determination on the consistency; and the second control information is quantized control information of 1 bit, one bit value of 1-bit values is allocated to a record control for Never Copy while another bit value is allocated to record controls including Once Copy and repeat transmission inhibit, among the control of the contents, and as a result of the determination on consistency between the first control information and the second control information, the control of the contents is executed based on the first control information.

3. A method for controlling contents data, said method comprising:

obtaining the contents data by an input unit in a detection device including a storage device for recording a new copy of the contents data;

detecting, by a processing unit in the detection device, first control information concerning control of contents from to the contents data;

detecting, by the processing unit, second control information concerning the control of the contents from the contents data, the second control information being added to the contents data in a manner different from the first control information;

determining, by the processing unit, consistency between the control of the first control information and the control of the second control information; and executing, by the processing unit, the control of the contents on the basis of the first control information or the second control information, in accordance with results of the determination on the consistency, wherein:

the executing step by the processing unit includes recording a new copy of the received contents data in the storage device in accordance with the determination results; and if neither the first control information nor the second control information is detected, it is determined that the contents do not require record control, and recording of the contents is authorized, if the first control information is detected although the second control information is not detected, it is determined that embedding of the second control information is not executed from the outset, and the record control of the contents is executed based on the first control information, if both the first control information and the second control information are detected, consistency between a substance of the first control information and a substance of the second control information is determined, and if both the substances match as a result of the determination, the record control is executed based on either the first control information or the second control information as matched while if both the substances do not match, control is executed so as to stop the recording of the contents.

* * * * *